US012337993B2

(12) United States Patent
Varrelmann et al.

(10) Patent No.: US 12,337,993 B2
(45) Date of Patent: Jun. 24, 2025

(54) MACHINING FACILITY FOR AIRCRAFT STRUCTURAL COMPONENTS

(71) Applicant: Broetje-Automation GmbH, Rastede (DE)

(72) Inventors: Nils Varrelmann, Varel (DE); Volker Neemann, Westerstede (DE)

(73) Assignee: Broetje-Automation GmbH, Rastede (DE)

( * ) Notice: Subject to any disclaimer, the term of this patent is extended or adjusted under 35 U.S.C. 154(b) by 0 days.

(21) Appl. No.: 16/634,014

(22) PCT Filed: Apr. 27, 2018

(86) PCT No.: PCT/EP2018/060898
§ 371 (c)(1),
(2) Date: Jan. 24, 2020

(87) PCT Pub. No.: WO2019/020226
PCT Pub. Date: Jan. 31, 2019

(65) Prior Publication Data
US 2020/0207487 A1    Jul. 2, 2020

(30) Foreign Application Priority Data

Jul. 24, 2017 (DE) ..................... 10 2017 116 718.8

(51) Int. Cl.
*B64F 5/10* (2017.01)
*B21J 15/14* (2006.01)
(Continued)

(52) U.S. Cl.
CPC ............... *B64F 5/10* (2017.01); *B21J 15/142* (2013.01); *B21J 15/42* (2013.01); *B23Q 39/024* (2013.01); *B23P 2700/01* (2013.01); *B23Q 1/623* (2013.01)

(58) Field of Classification Search
CPC ...... B23Q 39/024; B23Q 1/4804–4823; B23Q 1/525; B23Q 1/625; B21J 15/142;
(Continued)

(56) References Cited

U.S. PATENT DOCUMENTS 3,534,896 A * 10/1970 Krynytzky ............... B21J 15/14
227/51
4,821,408 A    4/1989 Speller, Sr. et al.
(Continued)

FOREIGN PATENT DOCUMENTS

DE    102006021946    11/2007
DE    102014113663    3/2016
(Continued)

OTHER PUBLICATIONS

"German Search Report," for German Patent Application No. 102017116718.8 mailed Jun. 26, 2018 (7 pages).
(Continued)

*Primary Examiner* — Matthew P Travers
(74) *Attorney, Agent, or Firm* — Pauly, DeVries Smith & Deffner LLC

(57) ABSTRACT

The disclosure relates to a processing installation for aircraft structural components having a processing station comprising a clamping frame, wherein the clamping frame extends along a station longitudinal axis, and a processing unit which has a first upper tool unit having an upper tool which is orientated along a first tool axis and a lower tool unit having a lower tool which is orientated along a second tool axis, wherein the first tool axis and the second tool axis can be orientated parallel with a vertical direction which is angled with respect to the longitudinal direction, and wherein in at least one processing position of the upper tool of the first upper tool unit and in at least one processing position of the lower tool of the lower tool unit the first tool axis and the
(Continued)

second tool axis are orientated coaxially relative to each other.

16 Claims, 1 Drawing Sheet

(51) Int. Cl.
  *B21J 15/42* (2006.01)
  *B23Q 1/62* (2006.01)
  *B23Q 39/02* (2006.01)
(58) Field of Classification Search
  CPC ....... B21J 15/42; B23P 19/04; B23P 2700/01; B64F 5/10; Y10T 29/49622; Y10T 29/49956; Y10T 29/5377; Y10T 29/53961
  See application file for complete search history.

(56) References Cited

U.S. PATENT DOCUMENTS

| | | | |
|---|---|---|---|
| 4,966,323 A | 10/1990 | Weaver et al. | |
| 4,967,947 A | 11/1990 | Sarh | |
| 5,329,691 A * | 7/1994 | Roberts | B21J 15/10 29/243.53 |
| 5,778,505 A * | 7/1998 | Mangus | B21J 15/142 227/51 |
| 6,726,610 B2 | 4/2004 | Graham et al. | |
| 2003/0024094 A1 | 2/2003 | Graham et al. | |
| 2007/0274797 A1 | 11/2007 | Panczuk et al. | |
| 2014/0251097 A1 | 9/2014 | Walz et al. | |
| 2015/0298274 A1* | 10/2015 | Ayestaran | B23Q 39/028 29/888.09 |
| 2017/0151643 A1 | 6/2017 | Ficken et al. | |
| 2017/0216998 A1* | 8/2017 | Rinaldi | B25B 11/005 |
| 2017/0333976 A1* | 11/2017 | Varrelmann | B64F 5/10 |

FOREIGN PATENT DOCUMENTS

| | | | |
|---|---|---|---|
| EP | 0956915 | 11/1999 | |
| EP | 2682225 | 1/2014 | |
| WO | 0117718 | 3/2001 | |
| WO | WO-2016046185 A1 * | 3/2016 | ............ B21J 15/04 |
| WO | 2019020226 | 1/2019 | |

OTHER PUBLICATIONS

"International Search Report and Written Opinion," for PCT Application No. PCT/EP2018/060898 mailed Jul. 16, 2018 (15 pages).

* cited by examiner

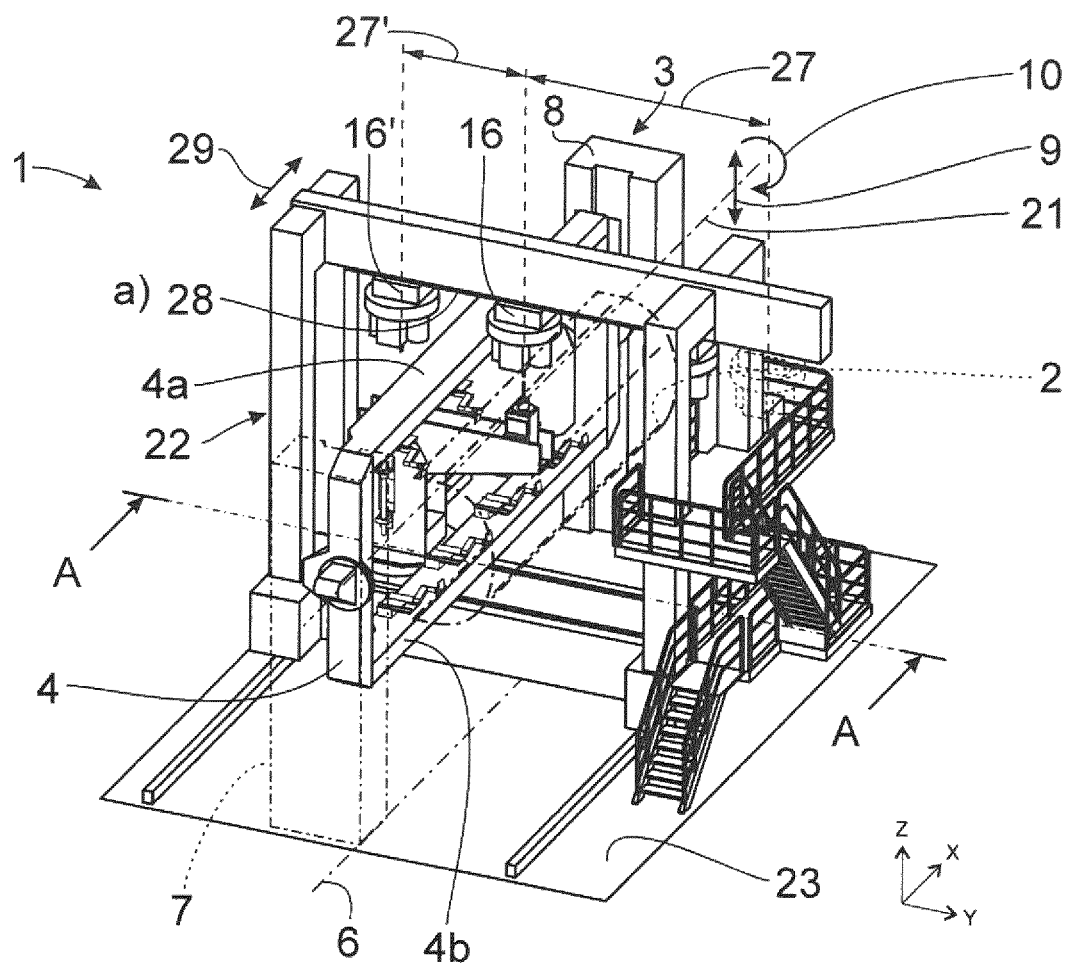
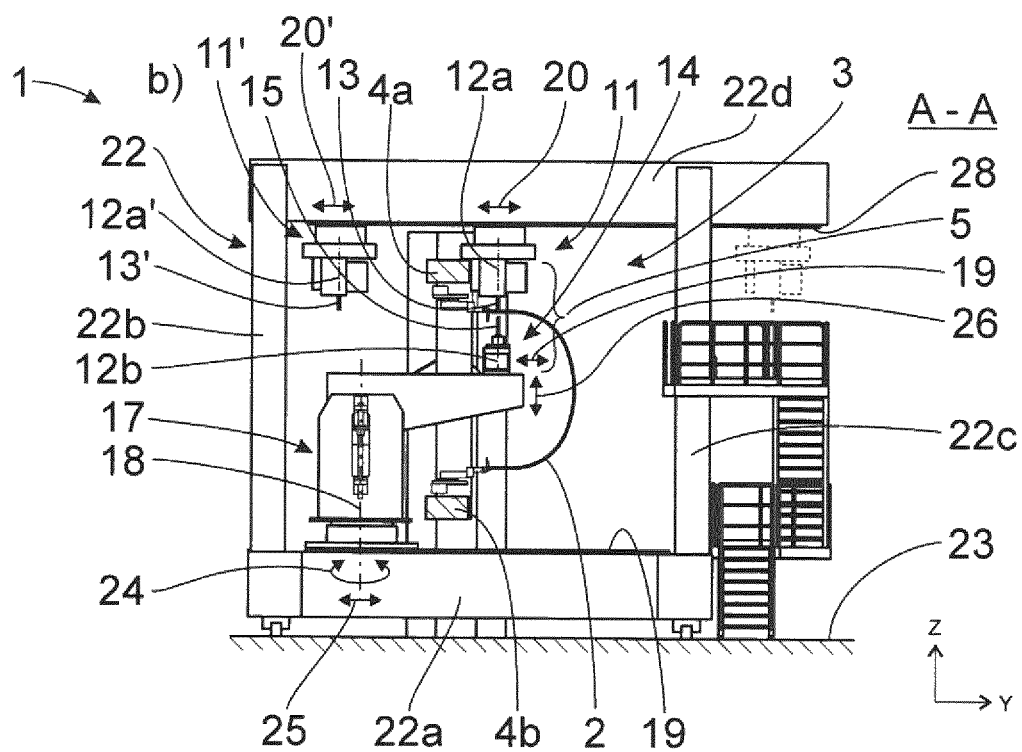

MACHINING FACILITY FOR AIRCRAFT STRUCTURAL COMPONENTS

CROSS-REFERENCE TO RELATED APPLICATIONS

This application is a national stage application under 35 U.S.C. 371 of International Patent Application Serial No. PCT/EP2018/060898, entitled "Machining Facility For Aircraft Structural Components," filed Apr. 27, 2018, which claims priority from German Patent Application No. DE 10 2017 116 718.8, filed Jul. 24, 2017, the disclosure of which is incorporated herein by reference.

FIELD OF THE TECHNOLOGY

The disclosure relates to a processing installation for aircraft structural components and a method for processing an aircraft structural component having a processing installation.

BACKGROUND

The production of missiles and in particular aircraft involves processing large aircraft structural components, such as, for example, the wings and the fuselage or portions thereof in special processing installations. The known processing installation (U.S. Pat. No. 5,778,505), on which the disclosure is based, has a processing station with a clamping frame for receiving the aircraft structural component which is intended to be processed in each case. The processing station is further provided with a processing unit in the form of a riveting unit, which has an upper tool unit having an upper tool and an associated lower tool unit having a lower tool, wherein, with a coaxial orientation of the tool axis of the upper tool relative to the tool axis of the lower tool, a riveting operation can be carried out on the aircraft structural component.

In the known processing installation, during the processing of an aircraft structural component it may be the case that a rivet element becomes jammed in the riveting tool which forms the upper tool and often has to be removed by hand before the processing operation can be continued. As a result of the particular size of such a processing installation, the respective upper tool is located several meters, for example, 6 meters, above the ground and therefore cannot readily be reached by the service operators. In order to remove a jammed rivet element or to be able to carry out other service operations, therefore, a service platform (service stage), via which the respective person can comfortably reach the upper tool, for the service personnel has to be moved into a region below the upper tool. Since the upper tool during the processing operation cooperates with a corresponding lower tool, it is also necessary in some circumstances for said service operations to also move a lower tool carrier which is associated with the lower tool and where applicable also the clamping frame with the aircraft structural component away from the upper tool so that the service platform can be positioned. Corresponding operations on the upper tool are therefore relatively complex and time-intensive and therefore lead to relatively long downtimes.

SUMMARY

The problem addressed by the disclosure is to configure and develop the known processing installation in such a manner that service operations on the upper tool can be simplified and service-related downtimes can be reduced.

The above problem is solved with a processing installation according to the disclosure.

An aspect is the basic consideration that, by providing a second upper tool unit, another upper tool is available and after a failure of the other upper tool can carry out the processing or at least a portion of the processing of the aircraft structural component in its place. Downtimes of the processing installation can thereby be considerably reduced. In the simplest case, the processing of the aircraft structural component is interrupted only for the period of time in which the additional upper tool unit is positioned relative to the commonly used lower tool in place of the upper tool unit having the failed upper tool. For example, as will be further described below, the upper tool unit with the failed upper tool is moved out of the previous processing region, in particular into a service position, whilst the other upper tool unit is moved into the corresponding processing region, in particular also out of a service position. In this manner, it is made possible to repair or maintain an upper tool, in this instance, for example, to remove a jammed rivet element, whilst another upper tool or a corresponding other upper tool unit enables the processing of the aircraft structural component to be continued.

In detail, the processing unit has, in addition to a first upper tool unit having a first tool axis which can be orientated coaxially relative to a second tool axis of a corresponding lower tool, a second upper tool unit having an upper tool which is orientated along a third tool axis, wherein the third tool axis can also be orientated coaxially relative to the second tool axis, whereby it is made possible for the processing operation which was previously carried out by the first upper tool unit or the first upper tool to be able to be continued by the second upper tool unit or the second upper tool. The second upper tool unit may thus be positioned in such a manner that the associated upper tool can be positioned in a processing position or processing positions which correspond to the processing position or the processing positions in which the upper tool of the first upper tool unit was positioned or could be positioned. In these processing positions, the respective upper tool then cooperates with the common lower tool which in this case assumes an associated processing position. A processing position of the upper tool or the lower tool is intended to be understood to be a position of the respective tool in which the processing of the aircraft structural component is possible. In particular, the processing is a riveting operation or drilling operation.

It should be noted that, in addition to the second upper tool unit, one or more additional corresponding upper tool units which serve the same purpose may also be provided. For the sake of clarity, only one second upper tool unit is discussed in this instance, wherein, however, the corresponding statements also apply to any additional upper tool unit which may be provided in addition to the first upper tool unit.

According to various embodiments, the first upper tool unit and the second upper tool unit can be moved in the same direction. The direction is in particular a transverse direction which is orthogonal with respect to the longitudinal direction and vertical direction. In this instance, the first tool axis and the third tool axis with respect to this direction or transverse direction can be arranged without offset with respect to each other, such as over at least a portion of the travel path. There is in particular over the largest portion or the entire travel path no offset in said direction or transverse direction. In various embodiments, the first upper tool unit and the second upper tool unit can be moved in the same plane, in particular in a plane which is orthogonal with respect to the vertical direction.

In various embodiments, the first upper tool unit and the second upper tool unit can be moved on a common guide, in particular a linear guide. In particular, the two upper tool units each have a separate upper tool carrier via which the connection to the guide is produced. This has the advantage that the first upper tool unit and the second upper tool unit can be displaced independently of each other. In principle, however, it is also conceivable for the upper tool of the first upper tool unit and the upper tool of the second upper tool unit to be connected to said guide by means of a common upper tool carrier.

According to various embodiments, the guide is a component of an upper frame portion of a frame of the processing installation. The upper frame portion extends in this instance in particular in the transverse direction. In addition, the frame may also have a lower frame portion which also extends in particular in the transverse direction, and one or two lateral frame portions which connect the upper frame portion to the lower frame portion. The frame may have a portal-like or C-shaped form. In such a frame, the guide is arranged in particular at the lower side of the upper frame portion, in particular at a height of at least 5 m, at least 6 m, or at least 7 m.

Such a frame enables a suitable operating height for processing various aircraft structural components, for example, fuselages or wings. The operating height, that is to say, the location at which the upper tool cooperates correctly with the lower tool, is in particular in a range from 5 m to 7 m, in a range from 5.5 m to 6.5 m, or in a range from 5.5 m to 6 m.

According to various embodiments, the upper tool units can be moved independently of each other and/or can be operated independently of each other in the processing unit. In particular, one of the upper tool units may be taken out of operation, whilst the other upper tool unit carries out the appropriate operations with the upper tool thereof.

In various embodiments, it is defined that when one of the upper tool units is used correctly, the other upper tool unit can be arranged in a service position in which this upper tool unit particularly does not influence the operating method of the other upper tool unit. The upper tool unit which is not in the service position can thereby be positioned in such a manner that the associated tool axis can be orientated coaxially relative to the second tool axis, that is to say, with respect to the tool axis of the lower tool.

Various embodiments provide the respective upper tool or equipment arrangement of the respective upper tool unit with specific upper tools. In particular, a rivet tool or drill tool may be provided as an upper tool. The respective upper tool unit may also be a combined upper tool unit having a rivet tool and a drill tool.

Various embodiments define drive possibilities which enable the mentioned displacement movements, in particular linear movements, of the first and/or second upper tool unit.

Various embodiments provide a method for processing an aircraft structural component having a processing installation as disclosed herein.

According to the additional teaching that during the processing of the aircraft structural component, in particular during a riveting operation or drilling operation, one of the two upper tool units is operated, that is to say, the corresponding upper tool carries out the correct actuation (riveting or drilling), whilst the other of the upper tool units is out of operation and/or is arranged in said service position. There is consequently always an upper tool unit available to continue the processing of the aircraft structural component when another upper tool unit has to be repaired or maintained.

Various embodiments provide a processing installation for aircraft structural components having a processing station comprising a clamping frame for receiving the aircraft structural component which is intended to be processed, wherein the clamping frame extends along a station longitudinal axis which extends in a longitudinal direction, and a processing unit for processing the aircraft structural component which has a first upper tool unit having an upper tool which is orientated along a first tool axis and a lower tool unit having a lower tool which is orientated along a second tool axis, wherein the first tool axis and the second tool axis are orientated and/or can be orientated parallel with a vertical direction which is angled, in particular orthogonal, with respect to the longitudinal direction, and wherein in at least one processing position of the upper tool of the first upper tool unit and in at least one processing position of the lower tool of the lower tool unit the first tool axis and the second tool axis are orientated coaxially relative to each other, wherein the processing unit has a second upper tool unit having an upper tool which is orientated along a third tool axis, wherein the third tool axis is orientated or can be orientated parallel with the vertical direction, and wherein in at least one processing position of the upper tool of the second upper tool unit and in at least one processing position of the lower tool of the lower tool unit the second tool axis and the third tool axis are orientated coaxially relative to each other.

In various embodiments, the first upper tool unit and the second upper tool unit can be moved in the same direction, in particular in a transverse direction which is orthogonal with respect to the longitudinal direction and vertical direction, over a travel path, in particular can be moved in a linear manner.

In various embodiments, the first tool axis and the third tool axis with respect to the direction over at least a portion of the travel path, such as over the main portion of the travel path, such as over the entire travel path, have no offset with respect to each other.

In various embodiments, the first upper tool unit and the second upper tool unit can be moved in the same plane, in particular in a plane which is orthogonal with respect to the vertical direction, over a travel path, in particular can be moved in a linear manner.

In various embodiments, the first upper tool unit and the second upper tool unit can be moved on a common guide, in particular a linear guide, over a travel path, in particular can be moved in a linear manner.

In various embodiments, the upper tool of the first upper tool unit and the upper tool of the second upper tool unit are each supported on a separate upper tool carrier, wherein the upper tool carriers are movably guided on the guide.

In various embodiments, the guide is a component of an upper frame portion of an in particular portal-like or C-shaped frame.

In various embodiments, the upper tool units can be moved independently of each other and/or can be operated independently of each other in the processing unit.

In various embodiments, at least one of the upper tool units, in particular the first upper tool unit, can be moved into a service position, in which the upper tool unit is spaced so far apart from the other upper tool unit, in particular the second upper tool unit, that the upper tool of the other upper tool unit can be arranged in at least one processing position, such as in several processing positions, such as in all processing positions, in which the tool axis thereof is orientated coaxially relative to the second tool axis.

In various embodiments, the upper tool of the first upper tool unit and/or the upper tool of the second upper tool unit is a rivet tool or a drill tool, such as the first upper tool unit and/or the second upper tool unit is in each case a combined upper tool unit having a rivet tool and a drill tool as an upper tool.

In various embodiments, the processing installation has a first drive motor for the travel movement, in particular linear movement, of the first upper tool unit and a second drive motor for the travel movement, in particular linear movement, of the second upper tool unit, such as wherein the first drive motor and the second drive motor can be activated independently of each other, and/or wherein the processing installation has a common drive motor for the travel movement, in particular linear movement, of the first upper tool unit and for the travel movement, in particular linear movement, of the second upper tool unit.

Various embodiments provide a method for processing an aircraft structural component having a processing installation as described herein, wherein during the processing of the aircraft structural component, in particular during a riveting or drilling operation, one of the upper tool units is operated, whilst the other of the upper tool units is out of operation and/or is arranged in a service position.

BRIEF DESCRIPTION OF THE DRAWINGS

Various aspects are explained in greater detail below with reference to the drawings which illustrate only embodiments. In the drawings:

FIG. 1a is a perspective view of a processing installation as proposed during the processing of an aircraft structural component, and FIG. 1b is a sectioned view of the processing installation according to FIG. 1a.

DETAILED DESCRIPTION

The illustrated processing installation 1 serves to process aircraft structural components 2 which, as mentioned above, may be fuselages, wings or other large aircraft structural components 2. The processing installation 1 has a processing station 3. The processing station 3 has, on the one hand, a clamping frame 4 for receiving the aircraft structural component 2 which is intended to be processed and, on the other hand, a processing unit 5 for processing the aircraft structural component 2.

The clamping frame 4 extends along a station longitudinal axis 6 which extends in a longitudinal direction X of the processing installation 1. The extent of the clamping frame 4 along the station longitudinal axis 6 is intended to be understood in broad terms. It means that the clamping frame 4 extends at least in a basic position parallel with the station longitudinal axis 6, for example, when the clamping frame 4 is orientated vertically and/or is orientated horizontally.

The clamping frame 4 is in this instance articulated to two positioning towers 7, 8 which extend parallel with the vertical direction Z so as to be adjustable in terms of height and pivotable. The height adjustability designated 9 in FIG. 1a and the pivotability is designated 10. In this instance, the height adjustability 9 may be possible separately for both positioning towers 7, 8 so that a tilting of the clamping frame 4 about a tilting axis which extends transversely relative to the station longitudinal axis 6 (not illustrated in this instance) can be produced.

The processing unit 5 comprises a first upper tool unit 11 having an upper tool 13 which is orientated along a first tool axis 12a and an associated lower tool unit 14 having a lower tool 15 which is orientated along a second tool axis 12b. Furthermore, the processing unit 5 comprises at least a second upper tool unit 11', in this instance precisely one second upper tool unit 11', having an upper tool 13' which is orientated along a third tool axis 12a', wherein the lower tool unit 14 is equally also associated with the second upper tool unit 11', that is to say, both the first upper tool unit 11 and the second upper tool unit 11' cooperate with the lower tool unit 14 in order to process an aircraft structural component 2 with each other. The respective upper tool unit 11, 11' and the common lower tool unit 14 in each case form an end effector, wherein the respective upper tool 13, 13' is in particular a rivet head or drill head and the lower tool 15 forms the corresponding counter-piece. One of the two upper tool units 11, 11' or both upper tool units 11, 11' may also have more than one upper tool 13, 13', in particular a rivet head and/or a drill head. In various embodiments, both upper tool units 11, 11' have both a rivet head and a drill head.

With the processing unit 5 in this instance having two upper tool units 11, 11' which can cooperate with one and the same lower tool unit 14, the upper tool units 11, 11' can replace each other where necessary during processing of the aircraft structural component 2. For example, it is conceivable in the event of a riveting operation which is carried out by the first upper tool unit 11 with the first upper tool 13, for a rivet element to become jammed in the upper tool 13, whereby this upper tool unit 11 is temporarily no longer functional. In this instance, in place of the first upper tool unit 11, the second upper tool unit 11' can be operated with one or more upper tools 13' which correspond to the upper tool(s) 13 of the first upper tool unit 11, together with the same lower tool unit 14 as before. The second upper tool unit 11' then takes on the function of the first upper tool unit 11, which during this time is taken out of operation. During the time in which the first upper tool unit 11 is out of operation, it can be repaired or maintained. For example, a jammed rivet element can be removed from the upper tool 13. During this time, the processing unit 5 and consequently the entire processing installation 1 can continue to be operated. Downtimes resulting from a repair or maintenance can thus be minimized.

The processing of the aircraft structural component 2 using the second upper tool unit 11' or the upper tool 13' of the second upper tool unit 11' can be carried out in the same manner as the processing using the first upper tool unit 11 or the upper tool 13 of the first upper tool unit 11.

The first tool axis 12a of the upper tool 13 of the first upper tool unit 11 and the second tool axis 12b of the lower tool 15 extend in this instance in a direction at an angle and in particular orthogonally with respect to the longitudinal direction X. This direction is in this instance also referred to as the vertical direction Z. In the embodiment in FIGS. 1a and b in each processing position of the upper tool 13 of the first upper tool unit 11 which is activated in this instance and of the lower tool unit 15, the first tool axis 12a and the second tool axis 12b are orientated coaxially relative to each other, thus both extend in alignment in the vertical direction Z. In the event that, as a result of a repair or maintenance operation which has to be carried out, the first upper tool unit 11 is intended to be taken out of operation, it can be moved into a service position (illustrated with dashed lines in FIGS. 1*a* and *b*) and the second upper tool unit 11' can, in order to take over the further processing of the aircraft structural component 2, be moved from the left (inactive) position illustrated in FIGS. 1*a* and *b* into the position in which the first upper tool unit 11 was previously located. During the further processing which is then carried out by the second upper tool unit 11', the third tool axis 12*a*' and the second tool axis 12*b* then also extend angularly in the direction and in particular orthogonally with respect to the longitudinal direction X, that is to say, the vertical direction Z, wherein also in this instance the third tool axis 12'*a* and the second tool axis 12*b* are orientated coaxially relative to each other, that is to say, are also both in alignment in the vertical direction Z.

In this instance, not only the two upper tool units 11, 11' can be moved, but also the lower tool unit 14. The adjustability or movability of the lower tool 15 or the lower tool unit 14 is designated 19 in FIG. 1*b* and the adjustability or movability of the upper tools 13, 13' or the upper tool units 11, 11' is designated 20.

The respective upper tool 13, 13' and the lower tool 15 are in the embodiment described in this instance each supported on an associated tool carrier 16, 16', 17, that is to say, the upper tool 13 on an upper tool carrier 16, the upper tool 13' on an upper tool carrier 16' and the lower tool 15 on a lower tool carrier 17, wherein the tool carrier 16, 16' 17 is in each case a component of the respective upper tool unit 11, 11' or lower tool unit 14. The lower tool carrier 17 is in this instance rotatable about a lower tool carrier axis 18 which is parallel with the vertical direction Z and which forms a rotation axis, in particular through at least 180°, or through at least 360°, which is designated 24 in this instance. In addition, the lower tool carrier 17 can be adjusted or moved in this instance in a transverse direction Y which is orthogonal relative to the longitudinal direction X and the vertical direction Z, which is designated 25 in this instance. For an optimum orientation of the tool axis 12*b* of the lower tool 15 with respect to the respective tool axis 12*a*, 12*a*' of the active upper tool 13' in different processing positions of the clamping frame 4, the lower tool carrier 17 comprises an upper carrier portion 17*a* in the form of a carrier bar 17*a* and a lateral carrier portion 17*b* in the form of a carrier column 17*b*, wherein the carrier bar can also be adjusted or moved relative to the carrier column 17*b* in the vertical direction Z, which is designated 26 in FIG. 1*b*.

In order now if necessary, in particular for servicing purposes, to be able to exchange the first upper tool unit 11 and the second upper tool unit 11' for each other in the simplest manner possible, the first upper tool unit 11 and the second upper tool unit 11' are in this instance linearly displaceable in the same direction over a travel path 27, 27', that is to say, in the transverse direction Y. The travel paths 27, 27' are shown in FIG. 1*b*. It should be noted that the first upper tool unit 11 and/or second upper tool unit 11' for processing an aircraft structural component 2 can also in principle be moved beyond the travel paths 27, 27' illustrated in this instance, if necessary.

As can be seen with reference to FIG. 1*a*, the tool axis 12*a* of the upper tool 13 of the first upper tool unit 11 (first tool axis) and the tool axis 12*a*' of the upper tool 13' of the second upper tool unit 11' (third tool axis) are arranged without offset relative to each other with reference to the transverse direction Y in this instance over the respective entire travel path 27, 27' thereof, that is to say, the tool axes 12*a* and 12*a*' overlap in the transverse direction Y, regardless of the respective position of the upper tool units 11, 11' relative to the transverse direction Y.

The two upper tool units 11, 11' also extend in the embodiment described in this instance in the same plane which extends in this instance orthogonally with respect to the vertical direction Z. Thus, the processing installation 1 has in this instance a portal-like frame 22 which has a lower frame portion 22*a* which also extends in this instance in the transverse direction Y. The lower frame portion 22*a* is connected at both sides to two frame portions 22*b*, 22*c* which extend in the vertical direction Z and which are spaced apart from each other in the transverse direction Y and which carry an upper frame portion 22*d* which also extends in the transverse direction Y. The upper frame portion 22*d* in turn has a guide 28, in particular a linear guide, which is a component of the upper frame portion 22*d*. The upper tool 13 of the first upper tool unit 11 and the upper tool 13' of the second upper tool unit 11' are in each case movably guided on the guide 28 by means of their respective associated upper tool carrier 16, 16' on which they are supported. The guide 28 is in this instance thus constructed as a common guide 28 for both upper tool units 11, 11'.

In the region inside the frame 22, the clamping frame 4 on which the aircraft structural component 2 which is intended to be processed is secured extends. The clamping frame 4, as explained above, can be pivoted within the frame 22 about the frame longitudinal axis 21 which is orientated in this instance parallel with the station longitudinal axis 6 but which can also be tilted relative to it.

For the sake of completeness, it should be noted that the frame 22 of the processing installation 1 may in principle also be constructed differently in order to carry the upper tool units 11, 11'. For example, it is also conceivable for the frame 22 to be constructed in a C-shaped manner, that is to say, to have only a single lateral frame portion 22*b* which connects the lower frame portion 22*a* to the upper frame member 22*d*. It is also conceivable to dispense with the lower frame portion 22*a*, wherein the lower tool carrier 18 in contrast to the embodiment set out here is then intended to be arranged on the substrate 23 irrespective of the frame 22. However, it is advantageous to arrange the lower tool carrier, 18, as in the present case, securely on the frame 22 or on the lower frame portion 22*a* since in this manner the assembly comprising the frame 22, the two upper tool units 11, 11' and the lower tool unit 14 can be moved relative to the clamping frame 4 and the aircraft structural component 2 in the longitudinal direction X or along the station longitudinal axis 6, wherein the upper tool units 11, 11' when they are active always remain orientated in an optimum manner relative to the lower tool unit 14. The movability of the frame 22 is designated 29 in FIG. 1*a*.

In this instance, the two upper tool units 11, 11' which can each have in this case both a rivet tool and a drill tool can be displaced independently of each other and, as already indicated, can also be operated (activated) independently of each other. In order to enable the mutually independent travel paths, the processing installation 1 in this instance has two drive motors (not illustrated), of which a first drive motor is associated with the first upper tool unit 11 and a second drive motor is associated with the second upper tool unit 11'. The drive motors can be actuated independently of each other. In principle, however, it is also conceivable for the first upper tool unit 11 and the second upper tool unit 11' to be moved by means of a common drive motor.

In addition to these two drive motors, there may further be provided additional drive motors, via which the additional mentioned rotational movements and linear movements of the above components of the processing installation 1 can be brought about. These drive motors may in particular also be activated independently of each other. The processing installation 1 as proposed may thus further have one or more of the following drive motors:

- a drive motor for the rotational movement of the lower tool carrier 17, in particular relative to the lower frame portion 22a,
- a drive motor for the linear movement of the lower tool carrier 17, in particular relative to the lower frame portion 22a,
- a drive motor for the linear movement of the lower tool 15, in particular relative to the lower tool carrier 17,
- a drive motor for the linear movement of the carrier bar 17a of the lower tool carrier 17, in particular relative to the carrier column 17b of the lower tool carrier 17,
- a drive motor for the linear movement of the lower frame portion 22a or the frame 22, in particular relative to the substrate 23.

A method for processing an aircraft structural component 2 with a processing installation 1 as proposed is disclosed.

It can be significant in the method as proposed that as a result of the construction of the processing installation 1 as proposed during the processing, in particular during a riveting or drilling operation, of the aircraft structural component 2, one of the upper tool units 11, 11' is operated, whilst the other of the upper tool units 11, 11' is out of operation and/or is arranged in a service position. In this manner, it is made possible to repair or maintain one of the upper tool units 11, 11', for example, to remove a jammed rivet element, whilst the other of the upper tool units 11, 11' in each case takes over the processing of the aircraft structural component 2 in place of the upper tool unit which is intended to be repaired or maintained. Downtimes of the processing installation 1 can in this manner be minimized.

The invention claimed is:

1. A processing installation for aircraft structural components having a processing station comprising a clamping frame for receiving the aircraft structural component, which is intended to be processed, wherein the clamping frame extends along a station longitudinal axis which extends in a longitudinal direction, and a processing unit for processing the aircraft structural component, wherein the processing installation comprises a frame comprising an upper frame portion having a guide, wherein the clamping frame extends in a region inside the frame and can be pivoted within the frame about a longitudinal axis of the clamping frame which may be orientated parallel with the station longitudinal axis but which can also be tilted relative to it, wherein the processing unit consists of two upper tool units comprising a first upper tool unit, which forms an end effector, and a second upper tool unit, which forms an end effector, and one lower tool unit, which forms an end effector, wherein the first upper tool unit and the second upper tool unit are independently of each other movable in a linear manner on the guide over a travel path and are configured to be operated independently of each other in the processing unit and wherein the lower tool unit is movable, wherein the first upper tool unit has an upper tool which is orientated along a first tool axis and the lower tool unit has a lower tool which is orientated along a second tool axis, wherein the first tool axis and the second tool axis are orientated and/or can be orientated parallel with a vertical direction which is angled with respect to the longitudinal direction, and wherein in at least one processing position of the upper tool of the first upper tool unit and in at least one processing position of the lower tool of the lower tool unit the first tool axis and the second tool axis are orientated coaxially relative to each other, wherein the second upper tool unit has an upper tool which is orientated along a third tool axis, wherein the third tool axis is orientated or can be orientated parallel with the vertical direction, and wherein in at least one processing position of the upper tool of the second upper tool unit and in at least one processing position of the lower tool of the lower tool unit the second tool axis and the third tool axis are orientated coaxially relative to each other;

wherein the first upper tool unit and the second upper tool unit are configured to cooperate with the lower tool unit, wherein the first upper tool unit and the second upper tool unit each comprise a rivet head configured to perform a riveting operation with the lower tool, wherein the first upper tool unit and the second upper tool unit each further comprise a drill head, and wherein the first upper tool unit and the second upper tool unit are configured to take on the function of each other during the processing of the aircraft structural component such that when a rivet element is jammed in the first upper tool unit, the first upper tool unit is moved out of a previous processing region into a service position in order to remove the jammed rivet element and the second upper tool unit is moved into a corresponding processing region and continues processing the aircraft structural component.

2. The processing installation as claimed in claim 1, wherein the first upper tool unit and the second upper tool unit can be moved in the same direction over the travel path.

3. The processing installation as claimed in claim 2, wherein the first tool axis and the third tool axis with respect to the direction over at least a portion of the travel path have no offset with respect to each other.

4. The processing installation as claimed in claim 2, wherein the first tool axis and the third tool axis with respect to the direction over at least a portion of the travel path, over the main portion of the travel path, have no offset with respect to each other.

5. The processing installation as claimed in claim 1, wherein the first upper tool unit and the second upper tool unit are configured to be moved in the same plane over the travel path.

6. The processing installation as claimed in claim 1, wherein the first upper tool unit and the second upper tool unit can be moved on the guide over the travel path.

7. The processing installation as claimed in claim 6, wherein the upper tool of the first upper tool unit and the upper tool of the second upper tool unit are each supported on a separate upper tool carrier, wherein the upper tool carriers are movably guided on the guide.

8. The processing installation as claimed in claim 6, wherein the guide is a component of the upper frame portion of a portal-like or C-shaped frame.

9. The processing installation as claimed in claim 1, wherein at least one of the upper tool units is configured to be moved into the service position, in which the at least one upper tool unit is spaced so far apart from the other upper tool unit, that the upper tool of the other upper tool unit is configured to be arranged in at least one processing position in which the tool axis thereof is orientated coaxially relative to the second tool axis.

10. The processing installation as claimed in claim 1, wherein the processing installation has a first drive motor for the travel movement of the first upper tool unit and a second drive motor for the travel movement of the second upper tool unit, and/or wherein the processing installation has a common drive motor for the travel movement of the first upper tool unit and for the travel movement of the second upper tool unit.

11. The processing installation as claimed in claim 10, wherein the first drive motor and the second drive motor can be activated independently of each other.

12. The processing installation as claimed in claim 1, wherein the first upper tool unit and the second upper tool unit can be moved in the same direction, in a transverse direction which is orthogonal with respect to the longitudinal direction and vertical direction, over the travel path.

13. The processing installation as claimed in claim 1, wherein the first upper tool unit and the second upper tool unit are configured to be moved in the same plane, wherein the plane is orthogonal with respect to the vertical direction, over the travel path.

14. The processing installation as claimed in claim 1, wherein at least one of the upper tool units is configured to be moved into the service position, in which the at least one upper tool unit is spaced so far apart from the other upper tool unit, that the upper tool of the other upper tool unit is configured to be arranged in several processing positions in which the tool axis thereof is orientated coaxially relative to the second tool axis.

15. The processing installation as claimed in claim 1, wherein the processing installation has a first drive motor for the travel movement, which is linear movement, of the first upper tool unit and a second drive motor for the travel movement, which is linear movement, of the second upper tool unit, wherein the first drive motor and the second drive motor can be activated independently of each other, and/or wherein the processing installation has a common drive motor for the travel movement, which is linear movement, of the first upper tool unit and for the travel movement, which is linear movement, of the second upper tool unit.

16. A method for processing an aircraft structural component using a processing installation as claimed in claim 1, wherein during the processing of the aircraft structural component one of the upper tool units is operated, whilst the other of the upper tool units is out of operation and/or is arranged in a service position.

* * * * *